United States Patent Office 2,930,749
Patented Mar. 29, 1960

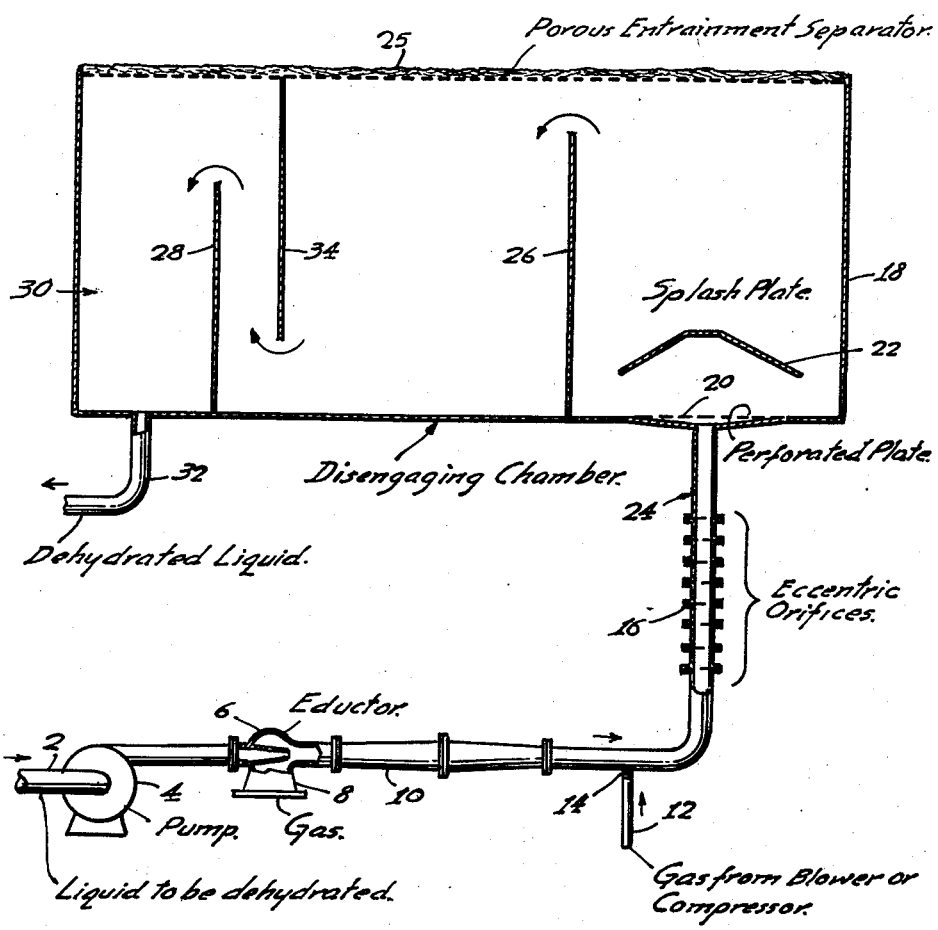

2,930,749

PROCESS AND APPARATUS FOR DEHYDRATING HYDROCARBON OILS

Harold Davis, Drexel Hill, Pa., assignor to Gulf Oil Corporation, Pittsburgh, Pa., a corporation of Pennsylvania Application June 3, 1954, Serial No. 434,280

5 Claims. (Cl. 208—187)

This invention relates to improved procedure for dehydrating liquids.

It has been known previously to dehydrate liquids by contacting them with a gas such as air. Such contact has usually taken place while the liquid was in a turmulent condition. See, for instance, U.S. Patents Nos. 1,144,522, 2,321,290 and 2,472,217. These previously known methods of dehydrating liquids have been relatively costly and frequently give a rather poor degree of dehydration.

Dehydration of liquids is important in many fields. For instance, the appearance of edible oils and petroleum distillates is undesirably affected by suspended water which imparts to them a cloudy appearance which reduces their marketability. Also, liquids containing water are corrosive and their field of use is therefore limited. In connection with liquids used for dielectric purposes such as transformer oils, the absence of water is essential.

This invention, therefore, has for its object to provide improved procedure and apparatus whereby the above noted difficulties can be avoided. Another object is to provide economical and effective procedure for dehydrating organic liquids. Another object is to provide improved procedure for dehydrating petroleum distillates. A still further object is to improve the state of the art.

These and other objects are accomplished by my invention which in its broader aspects includes method and apparatus for dehydrating a liquid by entraining a gas in a high velocity jet of the heated liquid to be dehydrated. This is accomplished by passing the jet through an eductor, the intake of which is connected to a gas source at a lower temperature. The mixture of liquid to be dehydrated and entrained gas is introduced into a settling chamber where the entrained gas, together with water contained in the liquid is removed from the upper surface of the liquid.

In the following examples and description, I have set forth several of the preferred embodiments of my invention, but it is to be understood that they are given by way of illustration and not in limitation thereof.

In the accompanying drawing I have illustrated diagrammatically a preferred embodiment of apparatus incorporating my invention and in which my improved process may be carried out. Referring to the drawing, number 2 indicates the intake to pump 4, which withdraws liquid to be dehydrated from intake line 2, and forces it as a high velocity stream or jet through eductor 6. Numeral 8 designates the intake of the eductor through which a gas such as air is educted by the action of the high velocity stream. This causes thorough intermixture of the liquid and gas which pass into mixing conduit 10 in the form of a suspension or foam. Numeral 12 designates a conduit through which additional air or gas may be introduced into the suspension or foam under pressure through a porous bubbler plate 14. Plate 14 may be formed of porous stone, sintered glass, perforated metal or the like. The mixture of liquid to be dehydrated and entrained air then passes through a series of baffles 16, which thoroughly intermix the liquid with the air or gas.

The construction of baffles 16 may be of any desired form which will give thorough intermixture as the air and liquid pass upwardly therethrough. However, I prefer to employ a series of spaced plates having a single perforation in each, which perforation is offset from the adjacent plate to cause the liquid to take a tortuous and turbulent path of flow therethrough.

Numeral 18 designates a separating chamber provided with baffles 20 and 22. Baffle 20 is preferably a perforated plate with a solid or unperforated center portion of about the same diameter as introduction conduit 24. The liquid and entrained air passing through perforated plate 20 at a relatively high velocity is prevented from impinging upon the porous top 25 of settling chamber 18 by splash plate of baffle 22. Porous top or cover 25 is constructed of wire mesh, glass wool or the like which acts to separate liquid globules entrained in the gas or air. These globules eventually commingle and flow back into separating chamber 18. The gas or air separates in chamber 18 and, as indicated, passes out of the chamber through porous cover 25. The liquid then flows over the top of baffle 26, under baffle 34 and over baffle 28 and, therefore, during its passage through separating chamber 18 is caused to take a long and turbulent path. This assures renewal of the surface of the liquid and release of gas entrained in the liquid. The liquid then accumulates in surge tank 30 formed at the end of separating chamber 18. Dehydrated liquid is removed from surge tank 30 through conduit 32. Baffle 34 assures that only liquid from the lower portion of separating chamber 18, which is therefore free of gas, flows into surge tank 30.

Extra gas need not always be introduced through conduit 12. In some cases, however, the amount of gas or air introduced through eductor 6 may be insufficient to effect the desired degree of dehydration. In that event, additional gas or air may be introduced through conduit 12. The porous plug 14 may be made of any porous material that will completely suspend the gas introduced through conduit 12 in the liquid or foam in conduit 10.

The air or gas introduced through eductor inlet 8 need not be heated. However, it is generally desirable to heat the liquid flowing through conduit 2 to a temperature of above about 125° F. A temperature of about 125° to 175° F. will ordinarily be satisfactory. In many commercial operations, a liquid to be dehydrated will already have a fairly high temperature. For instance, in the manufacture of petroleum distillates, a liquid containing some water vapor may be obtained and in such case it is preferred that the liquid, while it is still at the elevated temperature imparted to it in the preceding manufacturing operation, be introduced into the dehydrating system. Of course, if the temperature of the liquid as it comes from the preceding operation is too high, it may be cooled to the appropriate dehydrating temperature.

The eductor works on the well known principle of an ejector pump, i.e., the high velocity jet of liquid impinges against the gas molecules and forces them into the exhaust side of the pump which usually has a venturi shape. During this pumping action, the liquid and gas become thoroughly intermixed and this condition results in the gas becoming partially or completely saturated with the water or water vapor in the liquid. Heating of the liquid not only improves the removal of the water by increasing its vapor pressure, but it also improves the educting action. This is due to the fact that the vapors in the high velocity jet more easily mix with the gas being pumped and this, of course, results in better pumping action since these vapors have the same direction and velocity of movement as the liquid jet. Also, these vapors intermingle more thoroughly with the gas and therefore improve the dehydration effect.

The amount of gas employed will depend upon the amount of water vapor to be removed. Ordinarily, between about 0.4 and 3.0 cubic feet per gallon of liquid to be dehydrated and containing 0.4 to 3.0 grams of water per gallon will be satisfactory. However, larger or smaller amounts of air or other gas may be employed. It may be advantageous to employ dehydrated gas, but for most purposes ordinary atmospheric air has been found to be a very satisfactory gas. The use of undehydrated gas or air simplifies the operation without materially affecting the efficiency of water removal. If the air is at a lower temperature than the liquid to be dehydrated, it will be unsaturated with respect to water vapor after it is mixed with the heated liquid and therefore will absorb water vapor. This is true even though it is saturated with water vapor prior to mixing with the heated liquid. Atmospheric air will ordinarily be only partially saturated with water vapor and will ordinarily be at a much lower temperature such as 70°–90° F. Therefore, upon being contacted with the heated liquid at a temperature of 125° F. or higher, the atmospheric air would absorb considerable water vapor before reaching saturation. The gas should be substantially non-reactive with the liquid under the conditions of use. Thus in the case of easily oxidizable edible oils, it is desirable that the gas be a non-oxidizing gas such as, for instance, carbon dioxide or nitrogen. Of course, air can be used with the more stable edible oils such as olive oil and air may be used with more easily oxidizable liquids if lower temperatures are employed.

*Example*

A No. 2 fuel oil had the following characteristics and a hazy appearance due to the water content indicated:

| | |
|---|---|
| Gravity, ° API | 35.5 |
| Viscosity, SUV, sec., 100° F. | 35.3 |
| Flash, P-M, ° F. | 165 |
| Color, ASTM Union | 1.50 |
| Sulfur, L, percent | 0.97 |
| Water, p.p.m., Karl Fischer method | 200 |
| Neutralization value, ASTM D974–52T, total acid No. | 0.03 |
| Acid heat, ° F. | 9 |
| Aniline point, ° F. | 143.2 |
| Diesel index | 50.8 |
| Distillation, gas oil, ASTM D158–52: | |
|     Over point, ° F. | 370 |
|     End point, ° F. | 650 |
|     10% at ° F. | 448 |
|     50% at ° F. | 517 |
|     90% at ° F. | 601 |
|     Recovery, percent | 98.5 |
|     Residue, percent | 1.0 |
|     Loss, percent | 0.5 |

This No. 2 fuel oil was treated in apparatus similar to that illustrated in the drawing. It was heated to 125° F., forced through an ejector pump at a pressure of 150 p.s.i. and 0.6 cubic foot per gallon of fuel oil of atmospheric air at a temperature of 72° F. and at a relative humidity of 30% was entrained therein. This mixture was passed through a baffle system to effect thorough intermixture and was then separated into fuel oil and air in the manner described. The treated fuel oil was found to be free of the haziness present in the untreated fuel oil.

My invention is applicable to dehydrating liquids in general. While the invention is of particular value in connection with the dehydration of petroleum and its distillates, such as No. 2 fuel oil, lubricating oils and transformer oils, it is also of value in connection with the dehydration of other liquids such as edible oils. It is preferable that the liquid have a relatively low vapor pressure at the temperature of use, i.e., below about .2 to .5 p.s.i. at a temperature of 125°–175° F.

An unusual advantage of my invention is that the pump employed to force the liquid through the eductor can be one which is conventionally used to circulate the same liquid in the plant. As a matter of fact, the same pump may be used for both the dehydration and the conventional circulating of the liquid, either when the liquid is not being dehydrated or when it is being dehydrated. For instance, pump 4 could be a pump conventionally used in a plant to elevate a liquid to a certain piece of equipment. This elevation operation could be accomplished simultaneously with the dehydration, i.e., the outlet 32 would be at the desired elevation in such a system of operation.

What I claim is:

1. The method of dehydrating a liquid which comprises heating the liquid to be dehydrated, passing a high velocity stream of the heated liquid through a body of gas which is at a lower temperature than the heated liquid, thereby educting gas from the body of gas by entrainment in the high velocity stream of heated liquid, forming the heated liquid stream into a quiescent body of liquid containing the educted gas and separating the educted gas from the upper surface of the body of liquid.

2. The method of dehydrating a hydrocarbon liquid having a vapor pressure below about 0.2 to 0.5 p.s.i. at 125° to 175° F. which comprises heating the hydrocarbon liquid to between about 125°–175° F., passing a high velocity stream of the heated hydrocarbon liquid through a body of air, which air is at about atmospheric temperature and humidity and is at a lower temperature than the heated hydrocarbon liquid, whereby the air is educted by entrainment in the high velocity stream of heated hydrocarbon liquid, forming the hydrocarbon liquid stream into a quiescent body of liquid containing the educted air and separating the educted air from the upper surface of the body of hydrocarbon liquid.

3. The method of dehydrating a hydrocarbon liquid which contains residual heat imparted in a previous manufacturing operation which comprises passing a high velocity stream of the heated liquid hydrocarbon through a body of atmospheric air, which air is at approximately atmospheric temperature and humidity and is at a lower temperature than the heated hydrocarbon liquid, whereby the air is educted by entrainment in the high velocity stream of heated hydrocarbon liquid, forming the heated hydrocarbon liquid stream into a quiescent body of liquid containing the educted air and separating the educted air from the upper surface of the body of hydrocarbon liquid.

4. Dehydration apparatus comprising in combination a liquid pump, an eductor or ejector pump, the high pressure intake of which is connected to the outlet of the liquid pump and the gas intake of which is open to the atmosphere, a plurality of baffles housed in a closed chamber, each baffle having an orifice, which orifice is off-set from the orifice in each adjacent baffle, means connecting the outlet of the eductor or ejector pump with one end of the closed chamber housing the baffles, a conduit connecting the opposite end of the housing for the baffles to the inlet of a gas-liquid separating chamber provided with a splash plate superimposed over a perforated plate deflector at the inlet thereof, a porous entrainment separator positioned at the top of the separation chamber, a baffle positioned in the base of the separating chamber cooperating with a baffle positioned above the base of the separating chamber to cause liquid flowing through the separating chamber to flow alternately upward and downward, and means for removing dehydrated liquid from a point removed from the inlet to the separation chamber, said means being positioned more remote from the inlet, with respect to the path of travel of the liquid, than said baffles.

5. The method of dehydrating a hydrocarbon liquid which comprises heating the hydrocarbon liquid, passing a high velocity stream of the heated hydrocarbon liquid through a body of air which is at approximately atmospheric temperature and humidity and which is at a lower temperature than the heated hydrocarbon liquid, whereby the air is educted by entrainment in the high velocity stream of heated hydrocarbon liquid, introducing additional air under pressure into the suspension of heated hydrocarbon liquid and air by passing the additional air through a large number of small voids and thence into the suspension of hydrocarbon liquid and air, passing the suspension through a tortuous passage whereby turbulent motion is imparted to the suspension of hydrocarbon liquid and air with resultant thorough mixing, forming the suspension into a relatively quiescent body of liquid, the upper surface of which body is renewed whereby air suspended in the hydrocarbon liquid is separated from the upper surface of the body of liquid, passing the separated air through a mass of porous material to separate entrained hydrocarbon liquid therefrom, returning the separated entrained hydrocarbon liquid to the quiescent body of hydrocarbon liquid and withdrawing a stream of dehydrated hydrocarbon liquid from the quiescent body of hydrocarbon liquid after the air has been separated therefrom.

References Cited in the file of this patent

UNITED STATES PATENTS

| | | |
|---|---|---|
| 1,872,958 | Johnson | Aug. 23, 1932 |
| 2,455,670 | Graves | Dec. 7, 1948 |
| 2,630,878 | Hopper et al. | Mar. 10, 1953 |

OTHER REFERENCES

Vilbrandt: Chemical Engineering Plant Design, 3rd edition, page 79, McGraw-Hill Book Company, Inc. 1949.